Patented May 18, 1937

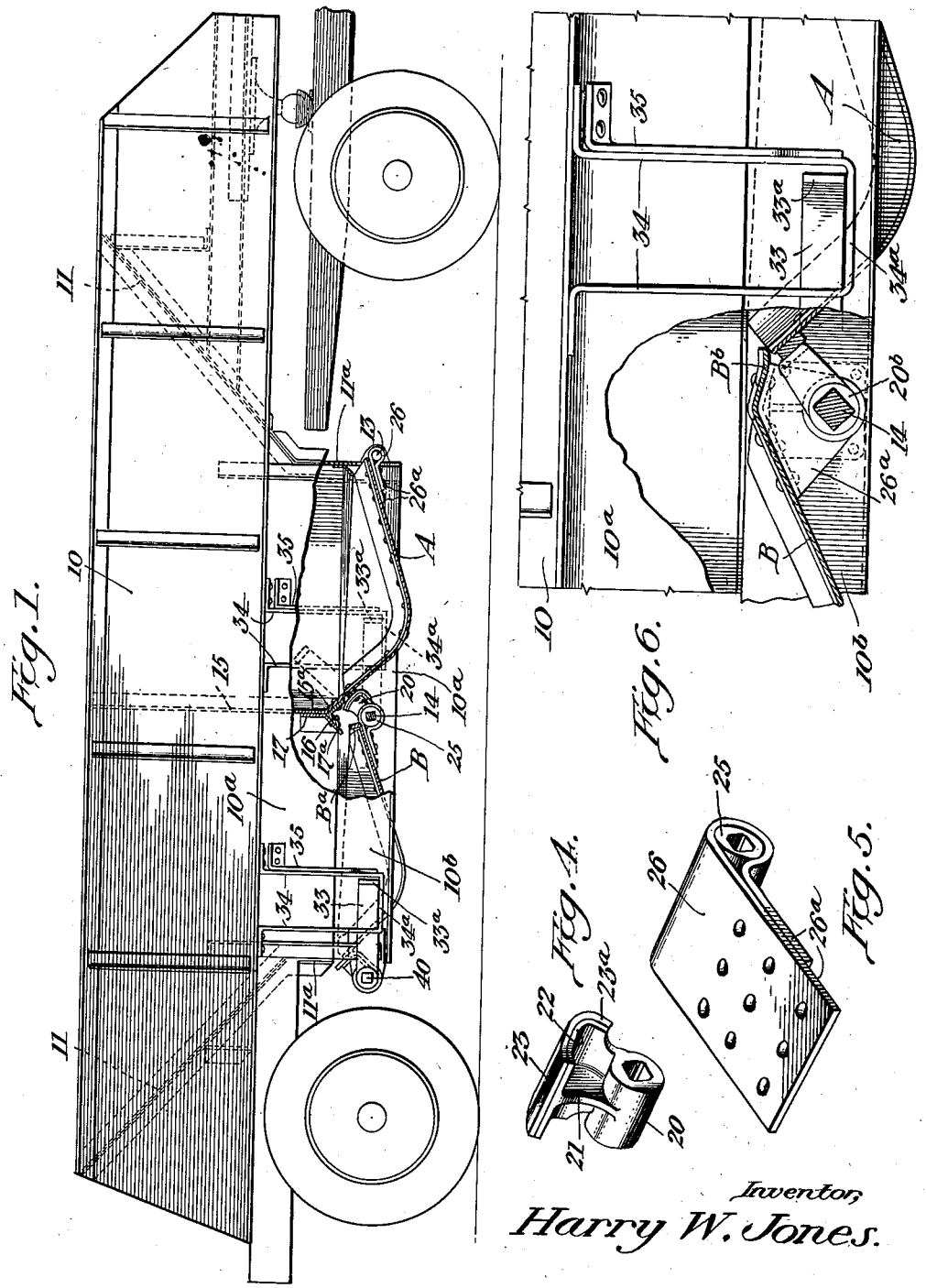

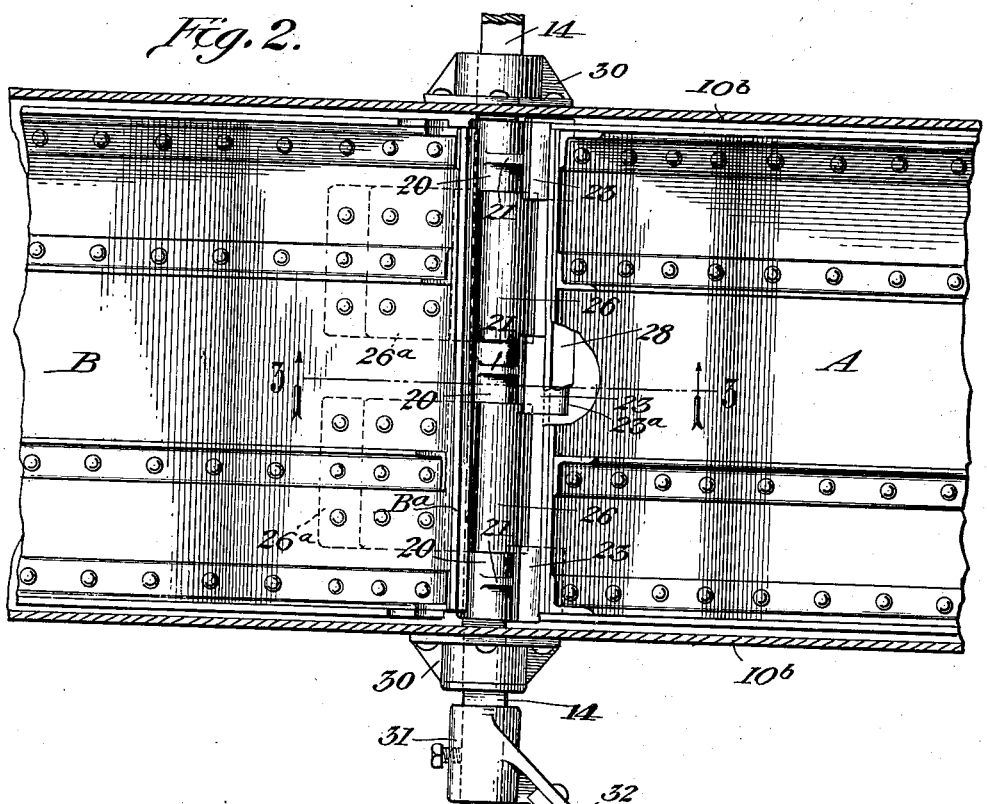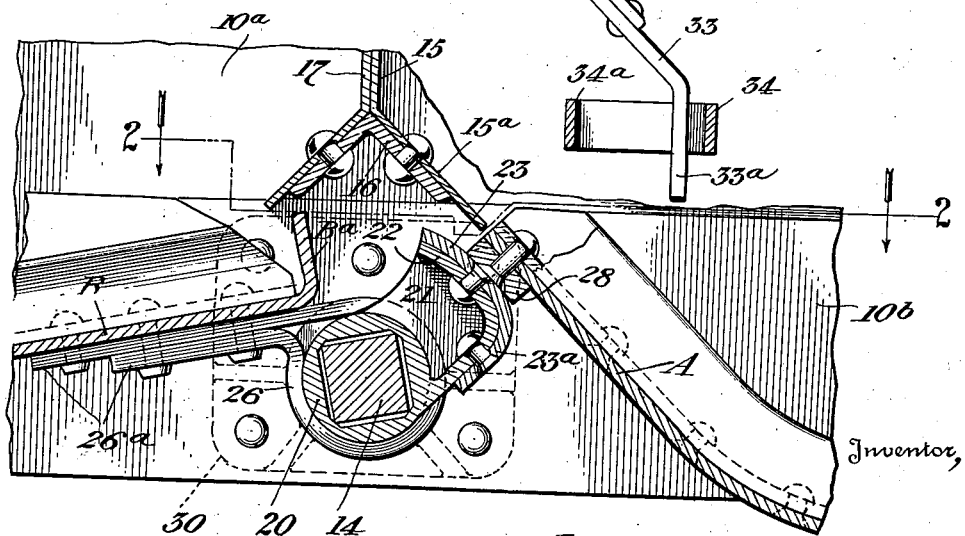

2,080,943

UNITED STATES PATENT OFFICE 2,080,943

DUMP VEHICLE

Harry W. Jones, Webster Groves, Mo., assignor to The Sanford Investment Company, Knoxville, Tenn., a corporation of Delaware Application February 15, 1933, Serial No. 656,937

11 Claims. (Cl. 298—30)

This invention relates to improvements in dump vehicles, and more particularly relates to the construction of an automatic bottom-dumping trailer for use with a motor tractor. Such a construction, employing a single bottom-dumping door, is shown in my copending application Serial No. 431,152, filed February 25, 1930.

According to the present invention, a plurality of bottom doors are provided, arranged on transverse axes, with individual latching mechanisms for the individual doors. With such an arrangement, it is essential to conserve space, and to avoid interference and conflict between the parts for one door and the parts for the adjacent door. Such a vehicle has great advantage in that the lading may be deposited under controllable conditions and without the necessity of hand operations other than the release of the latches, and permits the discharge of the lading at a rapid rate.

Illustrative forms of practicing the invention are set forth on the accompanying drawings, in which:

Figure 1 is a side elevation, with a portion broken away, showing a trailer assembly of the present type.

Figure 2 is a horizontal sectional view, on a larger scale, substantially on line 2—2 of Figure 3.

Figure 3 is a longitudinal upright sectional view substantially on line 3—3 of Figure 2.

Figure 4 is a perspective view of a latch cam.

Figure 5 is a perspective view of a door hinge.

Figure 6 is a view, on a somewhat smaller scale than but corresponding to a portion of Figure 1, and showing a modified form of construction.

In the drawings, the illustrated vehicle assembly is that of a single axle trailer adapted to be supported and moved by a motor-driven tractor. It is provided with side and end walls for providing a hopper bottom, this bottom being closed by a plurality of doors mounted on independent transverse axes and arranged in succession from front to rear, each door being provided with an individual latch mechanism. These doors are illustrated as of automatic type, i. e. the operation of raising the door toward closed position causes it to engage and operate its latch mechanism so that the door may be automatically latched in closed position.

In Figure 1, the trailer is illustratively shown as having the stiff side walls 10 and inclined end walls 11 for forming a body, in conjunction with the inwardly-inclined downward extensions 10a and the upright extensions 10b of the side walls, and similar extensions 11a of the end walls for providing a central open structure which may be closed by the plurality of independent doors. The front door A is mounted on a transverse pivot 13, which is supported by the lower body walls, in this preferred form by the side wall extensions 10b and the front end wall 11a. The rear door B is mounted for swinging movement about the axis of an intermediate transverse rod 14.

In the illustrated form, an intermediate transverse partition 15 divides the body into two compartments, and is stiffened at its bottom by an angle member 16. At its lower edge, the partition 15 has a forwardly inclined portion 15a (Fig. 3), and is also stiffened by a plate 17 having a rearwardly inclined portion 17a. These inclined portions are rigidly secured to the transverse stiffening angle 16, and constitute a baffle for providing beneath them a space to which the lading does not have ready access. The transverse rod 14 has its axis located beneath the angle member 16.

This rod 14 is of oblong, i. e. non-circular, shape, being illustrated as square, and passes through similarly shaped openings in a plurality of latch pieces 20, each of which has a radially extending web 21 and a peripheral axially extending portion 22 which may be reinforced, against deterioration by wear, by the securing thereto of the similarly curved wear plate 23 (Figs. 3 and 4). The shape of the external surface of this wear plate is substantially concentric for an arcuate portion sufficient to engage beneath the rear edge of the door A located just forward of the transverse rod 14, for securing this door in closed position. In addition thereto, the wear plate 23 has a portion 23a (Fig. 3) directed relatively toward the axis of rod 14, and presenting a downwardly and rearwardly inclined surface when the latch is in holding position, as shown in Figure 3, ready for engagement and actuation by the rear edge of the door A as the latter is swung upwardly toward closed position.

As shown in Figure 2, three such latching devices 20 are provided along the rod 14. Between these devices are provided bushings 25 having cylindrical external surfaces but preferably having their internal surfaces shaped to conform to the rod 14 (Fig. 5). These collars serve as pivot mountings for the rear door B. For this latter purpose, each of these bushings 20 is surrounded with a folded metal plate member 26 constituting a hinge piece and fitting loosely around the corresponding bushing 25 for rotation with respect thereto, and having parallel skirt portions 26a which are rigidly secured, as by riveting, to the forward edge of the rearward door B. These members 26 are employed in this preferred form as spacers for holding the latching devices 20 against undesired axial movement. The extreme forward edge of this rearward door B is preferably turned upwardly as at Ba to assist in preventing the escape of material from the body toward the rod 14, beneath the angle member 16.

Preferably, at the rear edge of each door A and B is provided a transverse reinforcing and wear-accepting strip 28 which rests upon the portion 23 of the latching devices when the doors are held in closed position.

The rod 14 is preferably supported by bearing brackets 30 rigidly connected to the side wall portions 10b.

At least one end of the rod 14 extends beyond its bearing brackets 30 and receives a collar 31 having a conforming opening, so that the collar turns with the rod. This collar is also provided with an arm 32 projecting in an axial plane and connected to an operating handle 33 having an end 33a bent into parallelism with the axis of rod 14. Extending downwardly from the body structure is a stirrup iron 34, which is preferably braced by an angularly positioned piece 35 connected to the adjacent wall extensions 10a. This stirrup is illustrated as located in an upright plane at right angles to the axis of rod 14, so that the handle end 33a at all times remains within this stirrup, and when this end 33a rests against the bight 34a of the stirrup (lower dotted line position, Fig. 1), the latch device portion 23 is beneath the transverse wear bar 28, and thus the door A is held in closed position. By raising the handle 33a (into the upper dotted line position of Fig. 1), it moves angularly with the rod 14, and the latching devices 20 are moved away from beneath the rear edge of the door A. Thus the door is freed so that it may fall down by gravity and under the weight of the lading, and permit discharge of this lading.

The stirrup 34 prevents the movement of the handle 33a into the vertical plane through the axis of rod 14, so that the latching devices may always return by gravity toward the position of Figure 1 when the handle 33a is released.

If the open door A be raised, however, it encounters the portions 23a of the latching devices, and causes a counterclockwise (Fig. 1) rocking of the latching devices and the rod 14 until the door can move upward past the latching devices. The latching devices and the rod 14 then immediately return to the position of Figure 3, by their own weight, and by the weight of the arm portions 32, 33 and 33a. Thus the door is automatically relatched when raised to closed position.

It will particularly be noted that these effects are produced by a movement of the rod 14 about its axis. The bushings 25 on the rod 14 turn within the hinge pieces 26 during this movement, and no effect is thus produced on the other or rearward door B.

In the illustrative form shown in Figure 2, both ends of the rod 14 extend beyond the bearing brackets 30, but the collar 31 is provided at one end only. It will be understood that with such an arrangement, the collar 31 may be removed from the lower end in Figure 2 and placed on the upper end of rod 14: obviously a stirrup structure 34, 34a may be provided at the other side of the vehicle.

A similar transverse rod 40 is provided at the rear edge of the rear door B, with the latching devices 20 thereon for this rear door. It likewise is provided with a collar 31 and a handle 33a for cooperation with a stirrup 34 in similar manner.

Thus, either door may be operated independently of the other, and yet only a small space is required for the provision of a transverse hinge at the front end of a rearward door and for the latching mechanism for the next forward door. Hence it is possible to provide a vehicle with a large capacity, and without serious obstruction to dumping at this point.

In the modified form shown in Figure 6, the body and hopper construction are substantially the same as before, except that the vertical partition 15 with the angle structures at its bottom is omitted. In this case the forward end Bb of the rear door B is bent downwardly so that it overlaps the rearward edge of the forward door A when the two doors are closed. The latching devices 20b are mounted as before on a transverse rod 14 which is provided with the crank arm 33, 33a engageable with the stirrup pieces 34, 34a. The other features of construction and the method of operation are substantially the same as before.

In each of these forms of construction, it will be noted that the vehicle has a large bottom opening through which the lading may be dumped, this opening being closed by a plurality of independently pivoted doors, which in the particularly illustrated forms are independently latched in closed position. In each case the doors include portions extending downwardly below the end walls 11a of the bottom structure even when in closed position, and likewise extending below the axle structures of the wheels which support the trailer and the tractor. Thus, the manual releasing of the latches in the present form will permit immediate dumping of the lading while the doors drag along the terrain, for example. By having a plurality of doors, each substantially opens to its full extent and the lading is deposited without the necessity of handling. When the unloading has been completed, the tractor and trailer may be driven over a fixed structure so that the doors A and B successively come in contact therewith. This structure need not extend to an elevation which will impede the movement of the tractor and trailer axles, as noted above: but is engaged by the doors and causes rocking movement of the doors about the axes of their respective pivots 13, 14, so that an automatic closing of the doors will occur. At the end of this closing movement, as pointed out above, each door engages the corresponding latch and moves it out of the path of the door so that when the door has attained its uppermost position, the latch will drop into engaging position.

In particular, the construction in which the independent latches are employed for the doors lends itself to a substantially simultaneous dumping of the lading above these doors and yet the latches do not interfere with the proper opening and closing movement of the doors.

It is obvious that the invention may be modified in many ways within the scope of the appended claims.

Having thus described the invention, what I claim as new and desire to secure by Letters Patent, is:

1. A drop-bottom dump vehicle having an open bottom structure, a plurality of drop-bottom doors for closing said bottom structure, means mounted on the bottom structure and supporting the doors adjacent the front edges thereof for independent pivotal movement about transverse axes, the pivot means for a rearward door being rotatable relative to the bottom structure and relative to the door pivotally mounted thereby, and latching devices secured to said rearward door pivot means for holding the next forward door in closed position.

2. A drop-bottom dump vehicle having an open bottom structure, a plurality of drop-bottom doors for closing said bottom structure, transverse pivot means for each door located adjacent the front end thereof, the pivot means for a rearward door including a rockable transverse rod having latching devices secured thereon for holding the next forward door in closed position, bushings on said rod between said devices, and hinge elements secured to the rearward door and surrounding said bushings and rotatable independently of said rod.

3. A drop-bottom dump vehicle having an open bottom structure, a plurality of drop-bottom doors for closing said bottom structure, transverse pivot means for each door located adjacent the front end thereof, the pivot means for a rearward door including a rod of oblong cross-section, at least one bushing of external cylindrical form on said rod, a hinge element secured to said rearward door and surrounding said bushing, latching means for the next forward door secured to said rod, said rod projecting laterally beyond said bottom structure, and means for rocking said rod located laterally outside said bottom structure.

4. A drop-bottom dump vehicle having an open bottom structure, a reinforcing baffle structure extending across said bottom structure, a plurality of drop-bottom doors for closing said bottom structure, transverse pivot means for each door located adjacent the front end thereof, the pivot means for a rearward door being located beneath said baffle structure and including a transverse rod rockable independently of said door and hinge elements secured to the rearward door and surrounding said rod, and latching devices for the next forward door secured for rocking movement with said rod between a door-holding position and a position beneath said baffle structure.

5. A drop-bottom dump vehicle having an open bottom structure, a plurality of drop-bottom doors for closing said bottom structure, transverse pivot means for each door located adjacent the front end of the corresponding door, the pivot means for a rearward door being supported by the bottom structure, and latching devices secured to said rearward door pivot means and movable independent of the rearward door for holding the next forward door in closed position.

6. A drop-bottom dump vehicle having an open bottom structure, a plurality of drop-bottom doors for closing said bottom structure, transverse pivot means for each door located adjacent the front end thereof, the pivot means for a rearward door being located at a greater distance from the pivot means of the next forward door than the length of said door whereby said rearward door pivot means is located rearwardly from the forward edge of the door pivoted thereon, and latching devices located on said rearward door pivot means for holding the next forward door in closed position and movable independently of the rearward door for releasing said forward door.

7. A drop-bottom dump vehicle having an open-bottom structure, a plurality of drop-bottom doors for closing said bottom structure, pivot means for each door located adjacent the front end thereof, the pivot means for a rearward door including a rockable transverse rod having latching devices secured thereon for holding the next forward door in closed position, said rod projecting laterally beyond said bottom structure, and means located laterally outside said bottom structure and engageable for rocking said rod and devices to door-releasing position.

8. A drop-bottom dump vehicle having an open-bottom structure, a plurality of drop-bottom doors for closing said open-bottom structure, transverse pivot means for each door located adjacent the front end thereof, the pivot means for a rearward door including a rod projecting laterally beyond said open-bottom structure and rockable independently of the said rearward door, latching means for the next forward door secured to said rod, and means located laterally outside said bottom structure and engageable for rocking said rod.

9. A drop-bottom dump vehicle having an open-bottom structure, a plurality of transverse shafts mounted on said bottom structure, a plurality of drop-bottom doors each hinged at its forward end to a said transverse shaft, the hinge shaft for a rearward door being movable independently of the corresponding door and serving also as the sole support for a latching device for holding the next forward door in closed position, and a latching device for said next forward door which is shiftable relative to both said rearward and forward doors.

10. A drop-bottom dump vehicle having an open-bottom structure, a plurality of drop-bottom doors for closing said open-bottom structure, pivot means for each door mounted on the open-bottom structure adjacent the front end of the corresponding door for providing transverse axes of movement for the doors, the pivot means for a rearward door including a device projecting laterally beyond the open-bottom structure and rockable relative to said bottom structure independently of the door movement, latching means for the next forward door secured to said device, and means located laterally outside said bottom structure for rocking said device whereby to move said latching means.

11. A drop-bottom dump vehicle having an open-bottom structure, a plurality of drop-bottom doors for closing said open-bottom structure, pivot means for each door mounted on the open-bottom structure adjacent the front end of the corresponding door for providing transverse axes of movement for the doors, the pivot means for a rearward door including a device rockable relative to said bottom structure independently of the door movement, latching means for the next forward door secured to said device, and means located laterally outside said bottom structure for rocking said device whereby to move said latching means.

HARRY W. JONES.